United States Patent [19]

Carman

[11] Patent Number: 5,422,019
[45] Date of Patent: Jun. 6, 1995

[54] METHOD FOR REMOVING CONTAMINANTS FROM INDUSTRIAL CLEANING SYSTEMS

[76] Inventor: Lyle Carman, 485 Forego Trail, Corbin, Ky. 40701

[21] Appl. No.: 200,419

[22] Filed: Feb. 23, 1994

[51] Int. Cl.⁶ .................. B01D 21/26; B01D 24/00
[52] U.S. Cl. .................. 210/787; 210/194; 210/200; 210/202; 210/207; 210/295; 210/512.1; 210/513; 210/760; 210/772; 210/800; 210/804; 210/805; 210/806; 134/10; 134/109
[58] Field of Search .......... 210/760, 772, 787, 800, 210/804, 805, 806, 194, 197, 220, 295, 512.1, 200, 202, 203, 207; 134/513, 10, 109

[56] References Cited

U.S. PATENT DOCUMENTS

| | | | |
|---|---|---|---|
| 1,743,465 | 1/1930 | Maag et al. | |
| 3,639,172 | 2/1972 | Keogh, Jr. | 134/10 |
| 3,901,254 | 8/1975 | Stearns et al. | 134/109 |
| 3,930,879 | 1/1976 | Erickson et al. | 134/10 |
| 4,105,553 | 8/1978 | Oldham | 210/804 |
| 4,288,329 | 9/1981 | Duval | 210/772 |
| 4,571,301 | 2/1986 | Inskeep, Jr. | 210/805 |
| 4,622,151 | 11/1986 | Hiltebrand et al. | 210/760 |
| 5,090,498 | 2/1992 | Hamill | 175/200 |
| 5,298,167 | 3/1994 | Arnold | 210/804 |

FOREIGN PATENT DOCUMENTS

| | | |
|---|---|---|
| 2203992 | 2/1989 | Japan . |
| 710672 | 5/1977 | U.S.S.R. . |
| 761035 | 7/1978 | U.S.S.R. . |

*Primary Examiner*—Robert A. Dawson
*Assistant Examiner*—David Reifsnyder
*Attorney, Agent, or Firm*—Luedeka, Neely & Graham

[57] ABSTRACT

Water-based industrial cleaning solutions are stripped of mixed oil and high density particulate (dirt) contamination by a full or partial flow system through, first, a centrifugal separator to produce two effluent flow streams respective to low and high density contamination. Each centrifugal separator effluent stream is conducted to and through respective gravimetric separators producing three effluent streams each. The two purified cleaning solution streams are combined for recycling. The two oil effluent streams are combined for disposal. The two particulate dominated streams are combined for screen or matrix filtration.

A small side stream such as effluent from the screen or filter is treated with ozone for bacterial control prior to recombination.

10 Claims, 3 Drawing Sheets

METHOD FOR REMOVING CONTAMINANTS FROM INDUSTRIAL CLEANING SYSTEMS

BACKGROUND OF THE INVENTION

The present invention relates to methods and apparatus for cleaning oil and dirt contaminated industrial parts. More particularly, the present invention relates to methods and systems for separating oil and dirt contamination from liquid cleaning medium circulated in a closed or partially closed flow loop.

Industrial cleaning solution is a descriptive phase that encompasses water-based alkaline cleaning solutions, acid cleaning solutions, lubricoolants, burnishing solutions and floor cleaning solutions. Such solutions are used in spray washes, dip tanks, steam cleaners, pressure washers and machine cutting tool coolant systems.

System volumes may range from a few gallons circulated at a half gallon per minute to tens of thousand of gallons circulated at hundreds of gallons per minute. A primary function of the circulated solution is to dissolve or emulsify oils and dislodge particles for flush removal. Consequently, water-based solutions are highly alkaline (caustic) solutions of emulsifier, surfactant and wetting agent.

Traditionally, the fluid circulation medium formulated for these industrial systems included inexpensive alkalis, surfactants, wetting agents and solvents. Little or no effort was made to filter or strip these solutions of accumulated contaminants. When saturated or contaminated to a predetermined degree, the solution charge was merely sewered and replaced with an entirely fresh make-up.

Under present regulations and standards of social accountability, many of the traditional solution make-up and contamination compounds are considered toxic and/or hazardous and are no longer accepted by public waste disposal facilities. The cost of private disposal has therefore steadily risen to the point the value of production waste disposal is a significant percentage of the product. Moreover, generators and transporters of toxic and hazardous waste are exposed to immense public liability in the event of public sector accidents and spills.

Due to increased composition and disposal costs, cleaning solution users have tended to hold and cycle a solution charge for longer time periods. If large sump tankage is available, some of the heavier, particulate contaminants will settle from the mixture. By keeping a solution circulating for more extended periods, however, has exacerbated bacteriological contamination. Solution sump tanks have been known to gelatinize in a few hours as a massive bacteria culture.

State-of-the-art filtration of these cleaning solution systems has proven to be largely ineffective due to the synergistic cooperation of both, fine particle contamination in the presence of oil or oil-like substances. Individually, either would quickly stratify for reliable separation. Oil and other low density substances having a specific gravity of less than 1.0 would rise and accumulate on a pond surface for separation by decantation. Dirt, scale and other high density particles having a specific gravity of greater than 1.0 would fall to the bottom of a pond in disposition for normal sediment disposal. Jointly, however, a mixture of oil and finely divided particles tends to create a colloidal suspension in which the low density oil coats the high density dirt particles for a buoyantly neutral composite. Attempts to screen or filter this suspension are frustrated by the oil presence which quickly blinds and plugs the filter permeability.

It is, therefore, an object of the present invention to provide a method and physical system for separating suspended contaminants from individual cleaning and processing solutions.

Another object of the present invention is to provide a method and physical system for controlling the growth of bacteria in industrial cleaning and processing solutions.

Another object of the present invention is to track a method and apparatus for continuously removing oil and particle contamination from a circulating system of industrial cleaning or processing solution at a rate at least equal to the contamination influx.

Another object of the present invention is to teach a method and apparatus for segregating oil and particle contaminants from a colloidal mixture of such contaminants in an industrial cleaning or processing solution.

SUMMARY OF THE INVENTION

In a representative application of the present invention, a detergent solution is used in a paint preparation wash process to remove oil and dirt from production parts. Frequently, such production parts will be painted by several different types of paint by different types of application equipment to produce a finished part. Consistent production of a quality product requires the painted part surface to be free of oil, dirt and chemical contamination.

The wash process comprises a wash stage followed by a drain stage which allows a substantially complete drainage of the applied detergent from the subject parts. A wash stage includes an application of the detergent solution to the parts surface in a manner designed to thoroughly clean the surface. This may be by shower, sprays or dip tanks as non-exclusive examples. Following drainage, the parts are rinsed with substantially clean water to flush residual detergent, oil and dirt. A rinse drain follows.

This representative process will normally include two liquid sump zones respective to the wash and rinse stages inclusive of the respective drain stages.

In a preferred embodiment of the invention, the contaminated washing solution or predetermined percentage of the total solution tankage or solution circulation is extracted from the respective collection tankage and flow processed through a centrifugal separation apparatus such as a cyclone or hydrocone to produce two effluent streams, both of which will include a significant percentage of washing solution possessed of useful chemical values and suitable for recycling. one such stream, however, is contaminated, primarily, by oil and low density undesireables whereas the other stream is contaminated primarily by dirt, scale and high density particles. Although both streams from the centrifugal separator will also be contaminated by a minority quantity of the opposite undesirable, that minority quantity will be remarkably low.

From the centrifugal separation, either or both of the effluent streams may be directed to a three stream effluent gravimetric separator for further decontamination. From the gravimetric separation, the light or low density effluent streams will be predominantly oil and oil-like contaminants. The heavy or high density effluent stream will predominantly be a wet sludge of heavy particles. The third effluent stream is substantially clean solution suitable for direct recycle.

It is not usually necessary to sterilize an entire recycle flow to keep the bacterial count under control. In most cases, sterilization of a small side stream is sufficient. when isolated from oil contamination which plugs a screen or matrix filter, the heavy particle effluent stream is particularly responsive to this type of final separation. Moreover, the quantity of solution extracted as filtrate from the heavy particle effluent stream is frequently of suitable volume for zone sterilization. Ergo, full flow of the heavy particle effluent stream filtrate is ozonated and recycled as fresh make-up to the rinse process circulation system.

Rinse system fluid may be a basic material source for fresh wash solution make-up thereby distributing the ozone content throughout the entire wash-process circulation system.

DESCRIPTION OF THE DRAWINGS

Relative to the drawings wherein like reference characters designate like or similar elements throughout the several figures and embodiments of the invention.

DETAILED DESCRIPTION OF THE INVENTION

Figure 1:
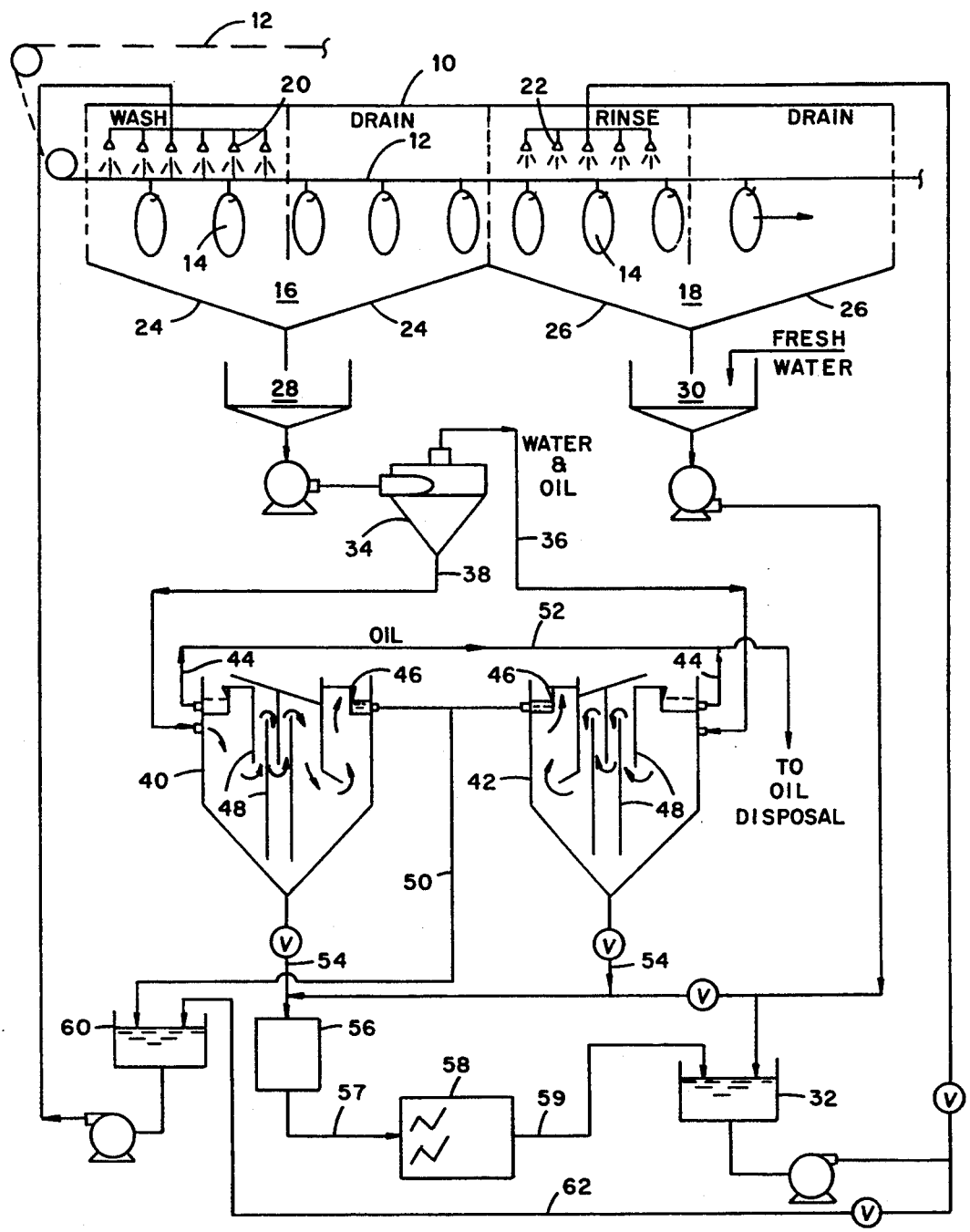
FIG. 1 is a flow schematic descriptive of a preferred embodiment of the invention.

A wash/rinse paint preparation system as represented by the FIG. 1 schematic is a typical industrial cleaning application of the present invention wherein a hood enclosure 10 includes a conveyor 12 traveling from left to right while supporting piece objects 14 which are the article subjects of the invention operation. The enclosure under the hood 10 is divided into two zones 16 and 18 respective to washing and rinsing circulation systems. The upstream halves of both zones are equipped with showers 20 and 22 respective to the wash and rinse circulation systems. The wash zone floor 24 extends under the shower and drain areas of wash zone 16 and is sloped to funnel contaminated wash solution into a collection vessel 28. Similarly, the rinse zone floor 30 funnels contaminated rinse solution into a rinse collection vessel 30.

The rinse circulation system supporting showers 22 usually is semi-closed and isolated. Ideally, the only contamination entering the circulation loop between the showers 22 and a sump tank 32 is a surface film quantity of detergent or caustic. Fresh make-up water is illustrated as introduced at the collection vessel 38 but may, in fact, be introduced at any point in rinse loop. Wash loop make up is extracted form the rinse loop. Desirably, the rinse loop fresh water make-up substantially equals the extracted wash loop make-up except for evaporation and attritional losses. Chemical losses from the wash system are therefore substantially recovered by the rinse system.

Contaminated wash solution energized by a pump, for example, is delivered to centrifugal separation means 34 such as a Hydrocone or Cyclone to produce two effluent streams 36 and 38 respective to low density and high density transport. It should be understood that neither effluent stream is free of the opposite density contaminant but only represents an increased concentration of one contaminant in fluidized mixture with the carrier solution. Accordingly, high density effluent stream 38 carries scale, dirt and other high density contaminants tending to have a specific gravity greater than 1.0 to a first gravimetric separation 40. Likewise, low density effluent stream 36 carries oil, foam and other low density contaminants tending to have a specific gravity less than 1.0 to a second gravimetric separator 42.

Both gravimetric separators 40 and 42 are substantially identical and constructed with an upper weir edge 44 serving an oil collection tray and a lower weir edge 46 serving a clean solution collection tray. In between are a number of vertical flow channeling baffles 48.

Piping conduit 52 drains the oil collection trays from both separators to a suitable recovery vessel or appliance such as a storage tank. Usually this oil is emulsified with water and is combined to some degree with particulates. Nevertheless, the net energy content may be sufficient to support heating appliance combustion. Conversely, by relatively low energy input, the oil effluent may be distilled for substantially pure oil recovery.

Piping conduit 50 drains the clarified solution recovery trays from both separators for delivery to a wash system sump tank 60 in direct recycle to the wash showers 20.

Piping conduit 54 drains the high density sludge collection from the bottom of both separators for delivery to a porous filter or continuously cleaned screen system 56. Without a significant oil contamination to plug a screen or micropore filter matrix, simple particulate filtration is very effective and yields a substantially clean wash solution stream 57 which is piped to an ozone generator 58 for biological decontamination.

Conduit 59 delivers ozone entrained or saturated clean wash solution to the rinse system sump tank 32 for wash system evaporative and attrition make-up carried by conduit 62.

Representative operational values for the subject invention may span a nearly infinite spectrum. The following specific value examples are therefore given as an illustration of the invention and without limitation objective.

A wash zone 16 cleaning system having approximately 2000 gallons in circulation is driven at a circulation rate of about 22 gallons per minute whereby the system wash solution is fully recycled over a 90 minute period.

For this particular application and operation, the Cyclone 34 is found to function most effectively with a 90/10 flow division whereby 90% of the Cyclone 34 throughput emerges through the oily or low density effluent conduit 36 and 10% of the throughput emerges through he high density effluent conduit 38. Consequently, conduit 36 will carry about 19.8 gallons per minute of oil contaminated wash solution whereas conduit 38 will carry about 2.2 gallons per minute.

It may be empirically determined that this oil contaminated effluent optimally requires about 5 minutes of transitional residence within a gravimetric separator 42 for oil separation and isolation from the clarified wash solution. To provide such 5 minute residence time to a 19.8 gallon per minute flow rate requires a 99 gallon gravimetric tank 42 capacity.

By similar empirical determination, it may be determined that this high density effluent flow stream 38 optimally requires about 10 minutes of gravimetric separator 40 residence time for satisfactory dirt settling and separation from the clarified wash solution. Accordingly, for a 10 minute residence time to a 2.2 gallon per minute flow rate, a 22 gallon gravimetric tank 42 capacity is required.

In practical application, due to variables such as wash solution effective chemical concentration, solution temperature and contaminate influx rate, such empirically based gravimetric tank volume determinations are increased by about 50%. In this case, a 150 gallon low density gravimetric tank 42 would be used along with a 35 gallon high density tank 40.

The rinse circulation system is frequently sized arbitrarily as half the volumetric capacity of the wash system, although evaporation and carry-over may suggest a dramatic departure from this convenient "thumb" rule. Proceeding with the 50% "rule" therefore the rinse system will circulate 1000 gallons of substantially clean, fresh water.

If the net volumetric loss from the wash system is 100 gallons per hour due to evaporation and other causes, 800 gallons in an 8 hour shift will be drawn from the 1000 gallon rinse system for the purpose wash system make-up. Consequently, 100 gallons per hour of fresh make-up water is added to the rinse system in addition to the evaporation and carry-out losses from the rinse system. Normally, this would be about 25 additional gallons per hour from the representative system. In sum, the entire 1000 gallon rinse system volume would be replaced with fresh water over each 8 hour operating period. Conversely, maximum contamination of the rinse system at any moment would be a 1 day accumulation. This criteria relates to the ozone generation capacity discipline which normally requires about 1 gram of ozone per day for each 100 gallons of system volume. The rinse system volume was previously determined to be 1000 gallons. In the interest of conservative flexibility, the calculation discipline will double that value to 2000 gallons as basis for choosing a 20 gram per day ozone generation unit 58.

The ozone operational generation rate is controlled to a predetermined flow stream concentration value (set-point) by an oxidation-reduction potential (ORP) meter.

Figure 2:
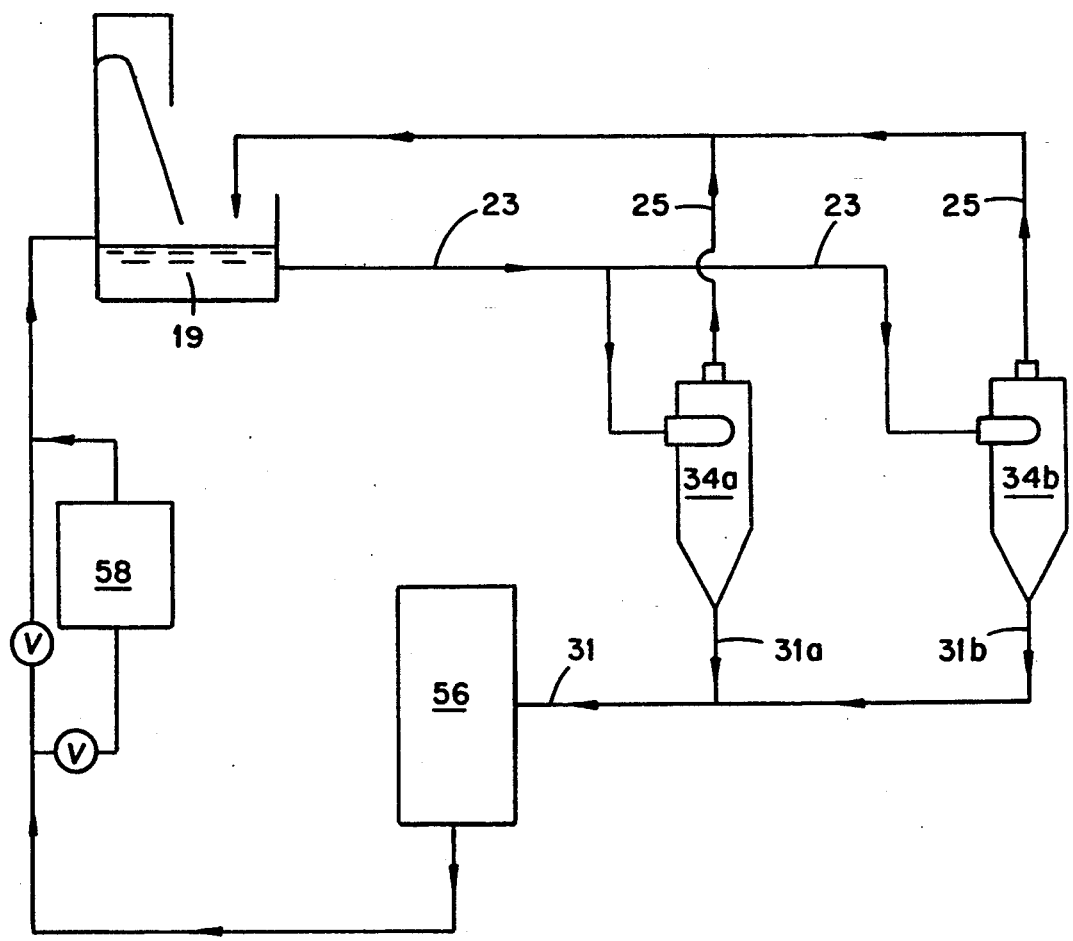
FIG. 2 is a first alternative embodiment flow schematic of the invention having particular utility for paint booth applications.

Paint booth overspray collection systems have the specialized function of extracting paint vapors and particles from the booth air circulation system. The most fundamental principle of these extraction systems is surface tension and solution capture of the paint constituent contaminants in a cascading curtain of liquid through which or over which the booth air is drawn by an induced draft fan. The water based liquid comprises chemicals formulated to solidify and defoam the paint solution. Using the present invention as shown schematically by FIG. 2, an approximately 10% flow stream 23 from the air contact liquid circulation sump 19 is pumped into one or more Cyclone units 34a and 34b for an approximate 90/10% flow division. The 90% low density flow stream 25 is directed back to the booth sump 19 for immediate recycle.

The 10% flow stream 31 is filtered and ozonated for bacteria control prior to return to the booth sump 19. The paint overspray quantity, the type of paint used and recovery liquid volume will determine the type of filter 56 required and size of ozonator 58 employed.

Figure 3:
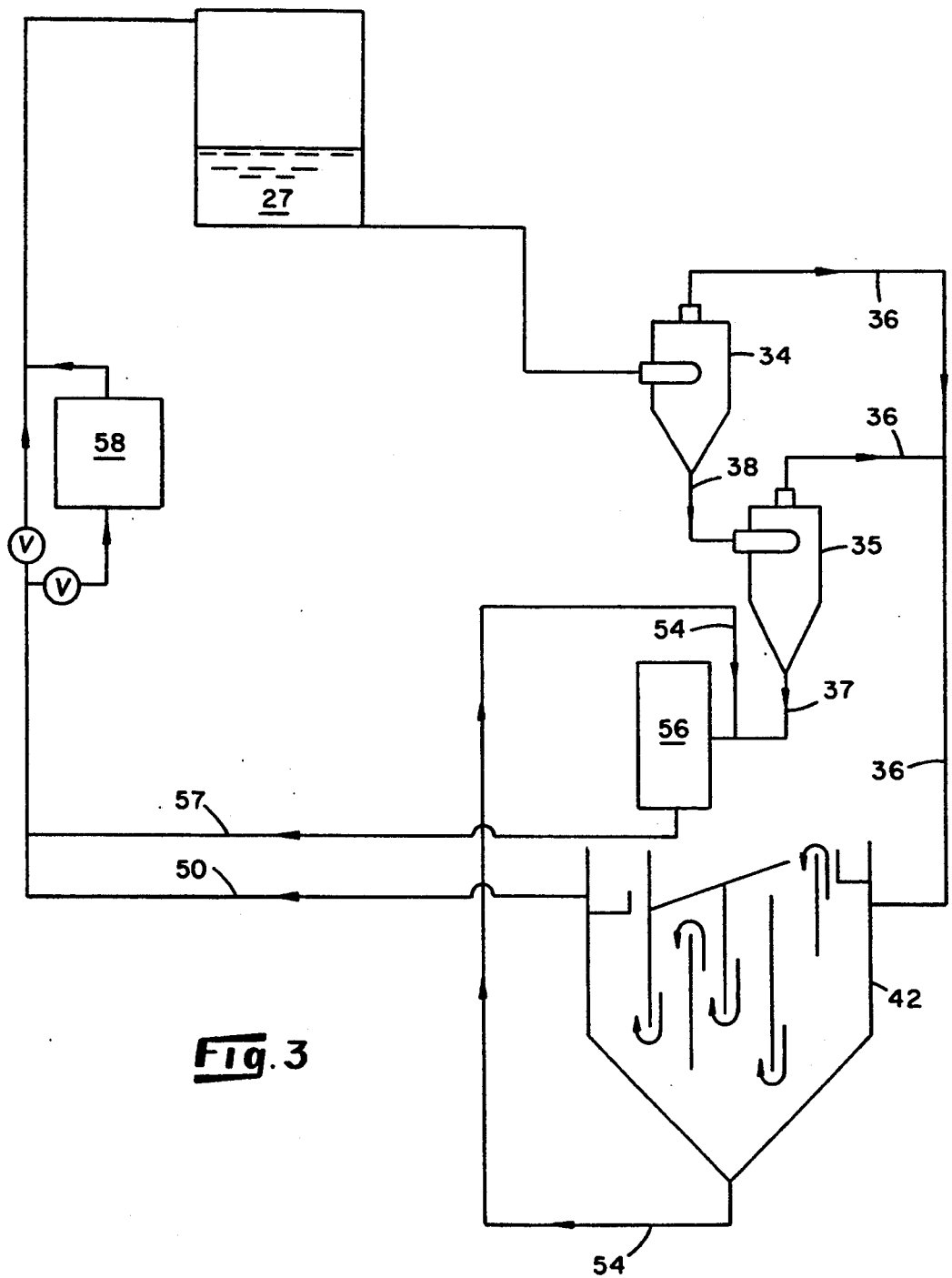
FIG. 3 is a second alternative embodiment flow schematic of the invention having utility as a lubricoolant reconditioning system.

Machine cutting tool lubricoolant recovery systems, represented by the FIG. 3 schematic sump tank 27, include synthetic and semi-synthetic water soluble oils. The present invention advantageously uses a cascaded plurality of centrifugal separators 34 and 35 with the line flow following the high density effluent recovery to the filter 56 and thereafter to the ozone treated stream 51 and 58.

The low density effluent stream 36 from the Cyclones 34 and 35 is directed to gravimetric separation 42 as described for the FIG. 1 parts cleaning system. Clarified lubricoolant drawn through effluent line 50 is combined with the filtrate 57 to provide a side or parallel stream flow for the ozonator 58.

High density or sludge flow from the gravimetric tank 42 bottom is piped for combination with the high density effluent 37 from the last cascaded Cyclone 35 for filter 56 influx.

Having fully disclosed the preferred embodiments of our invention,

We claim:

1. A system for separating accumulated oil and particulate contaminants from a circulating primary flow stream of industrial cleaning fluid comprising centrifugal fluid separation means having first and second effluent streams, said first effluent stream predominately comprising a mixture of said cleaning fluid, lesser density liquids and a smaller proportion of greater density particulated solids, said second effluent stream predominantly comprising a mixture of said cleaning fluid, greater density particulated solids and a smaller proportion of lesser density liquids, said first effluent stream being carried to first gravimetric separator means having third, fourth and fifth effluent streams, said third effluent stream predominantly comprising said lesser density liquids, said fourth effluent stream predominantly comprising said cleaning fluid and said fifth effluent stream predominantly comprising said greater density particulated solids mixed with a fluidizing portion of said cleaning fluid, said fifth effluent stream being combined with at least a portion of said second effluent stream and carried to particulate filter means to produce a sixth effluent stream predominantly comprising said cleaning fluid essentially free of said particulated solids, said sixth effluent stream being combined with said fourth effluent stream for recycle flow with said primary flow stream.

2. A system for separating accumulated oil and particulate contaminants from a circulating water-based industrial cleaning fluid as described by claim 1 wherein said sixth effluent stream is combined with ozone prior to recycle combination.

3. A system for separating accumulated oil and particulate contaminants from a circulating water-based industrial cleaning fluid as described by claim 1 comprising a second gravimetric separator means to receive substantially all of said second effluent stream, said second gravimetric separator means having respective third, fourth and fifth effluent streams combined with third, fourth and fifth effluent streams respective to said first gravimetric separator means.

4. A system for separating accumulated oil and particulate contaminants from a circulating water-based industrial cleaning fluid as described by claim 3 wherein said combination of fifth effluent streams are combined before said particulate filter means.

5. A system for separating accumulated oil and particulate contaminants from a circulating water-based industrial cleaning fluid as described by claim 4 wherein said sixth effluent stream from said particulate filter means is combined with ozone prior to recycle combination.

6. An industrial parts cleaning system having a primary cleaning section, a rinsing section and a water-based cleaning fluid circulation system for delivering and removing respective flow streams of cleaning fluid to and from said cleaning and rinsing sections, first conduit means for carrying said flow stream from said cleaning section to a centrifugal separator for separating said flow stream into first and second effluent streams, said first effluent stream comprising a mixture predominately of said cleaning fluid mixed with oil and other lesser density contaminants and a smaller proportion of said particulates and other greater density contaminants, said second effluent stream comprising a mixture predominantly of said cleaning fluid mixed with solid particulates and other greater density contaminants and a smaller proportion of oil and other lesser density contaminants, second conduit means for carrying said first effluent stream into first gravimetric separation means and third conduit means for carrying said second effluent stream into second gravimetric separation means, both of said gravimetric separation means having third, fourth and fifth effluent streams flowing therefrom, said third effluent streams predominantly comprising said cleaning fluid, said fourth effluent stream predominantly comprising said oil and lesser density liquids, and said fifth effluent stream predominantly comprising said solid particulates and other greater density contaminants, said third effluent streams respective to said first and second gravimetric separation means combined by fourth conduit means for recycle flow to said primary cleaning section, said fifth effluent streams respective to said first and second gravimetric separation means combined by fifth conduit means for carrying said combined fifth effluent streams to particulate filtration means.

7. An industrial parts cleaning system as described by claim 6 comprising sixth conduit means for carrying said fifth effluent streams from said particulate filtration means to ozonation means for combination with ozone.

8. An industrial parts cleaning system as described by claim 7 wherein said ozone combined stream is recycled to said rinsing section.

9. A method of separating oil and particulate contamination from a water-based alkaline industrial cleaning solution comprising the steps of:
   withdrawing contaminated solution from a cleaning appliance;
   flowing said contaminated solution through a centrifugal separation apparatus to produce first and second effluent streams comprising mixtures of said cleaning solution, oil, lesser density contaminants, particulate solids and greater density contaminants in respective proportions, said first effluent stream mixture predominantly comprising said cleaning solution, oil and lesser density contaminants, said second effluent stream mixture predominantly comprising said cleaning solution, particulate solids and greater density contaminants;
   flowing said first effluent stream through a gravimetric separation apparatus to produce third, fourth and fifth effluent streams, said third effluent stream predominantly comprising said cleaning solution, said fourth effluent stream predominantly comprising oil and lesser density contaminants, said fifth effluent stream predominantly comprising greater density particulated solids fluidized by said cleaning solution;
   flowing said fifth effluent stream through particulate filter means to produce a sixth effluent stream substantially free of said particulated solids; and,
   combining said fourth and sixth effluent stream for recycle flow with said cleaning solution.

10. A method of separating oil and particulate contamination from a water-based alkaline industrial cleaning solution as described by claim 9 wherein said method additionally comprises the combination of ozone with said sixth flow stream.

* * * * *